UNITED STATES PATENT OFFICE 2,545,433

3-NITRO-4-HYDROXY-THIOPHANES

Cyril Grob, Basel, Switzerland, assignor to Haco-Gesellschaft A. G., Gumligen, near Berne, Switzerland, a Swiss company No Drawing. Application April 5, 1949, Serial No. 85,707. In Switzerland May 8, 1946

Section 1, Public Law 690, August 8, 1946
Patent expires May 8, 1966

12 Claims. (Cl. 260—329)

The present application is a continuation-in-part application of my copending application Ser. No. 761,729, filed on July 17, 1947, now abandoned.

My present invention relates to new substituted thiophanes and more particularly to 3-nitro-4-hydroxy-thiophanes substituted in 2-position by alkyl groups which may carry further substituents. The new substituted thiophanes of my present invention can be represented by the following general formula:

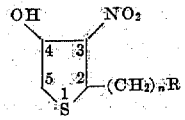

wherein $n$ means an integer from 1 to 7 inclusive and R means hydrogen, a hydroxyl, alkoxyl, halogen, formyl, carboxyl, carbalkoxy, carbamido or cyano radical.

A further object of my present invention is to provide a new method for the production of 3-nitro-4-hydroxy-thiophanes of the above given general formula.

According to one feature of this invention the said new compounds are obtained by condensation, i. e. by causing ring-closure of 2-nitro-2'-oxo-diethylsulfides substituted in 1-position and corresponding to the following general formula:

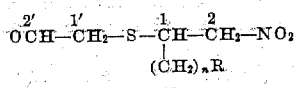

wherein $n$ and R have the same meanings as above.

A further modification of this invention consists in that, instead of 2-nitro-2'-oxo-diethylsulfides, it is also possible to use, as starting materials, compounds yielding in situ the said sulfides.

Such compounds must carry a group present for the purpose of "masking" the aldehyde group and which can be split off, while forming the aldehyde and causing subsequently ring-closure without any need of isolating the intermediary aldehyde. In this way it is possible to produce the thiophane derivative in the same reaction vessel. As such starting materials, use may be made of addition compounds for instance compounds, such as bisulfite addition compounds or acetals of the respective aldehydes.

The ring-closure according to the present method will preferably be effected in the presence of an organic or inorganic base, such as potassium hydroxide, sodium hydroxide, calcium hydroxide, sodium ethoxide, or an amine such as trimethylamine, hexahydrodialkylaniline and the like.

2-substituted 3-nitro-4-hydroxy-thiophanes are also formed when ammonia, preferably in a diluted condition, primary or secondary amines are employed for ring-closure. In this latter case, however, besides the above compounds also 2-substituted 3-nitro-4-amino-thiophanes, 3-nitro-4-mono-alkylamino-thiophanes or 3-nitro-4-dialkylamino-thiophanes respectively may be formed. Furthermore the ring-closure may preferably be carried out in an aqueous solution of the sulfides used as starting materials or in the presence of an inert solvent, such as methanol, ethanol, ether, dioxane and the like. Moreover, it may be advantageous to work in the presence of an inert atmosphere, such as for instance nitrogen.

3-nitro-4-hydroxy-thiophanes substituted in 2-position are easily accessible by this novel process and constitute useful and valuable intermediates for the preparation of valuable compounds. For instance biotin, a vitamin of vital importance, can be prepared from 2-(4'-carboxybutyl)-3-nitro-4-hydroxy-thiophane. It is evident for anybody skilled in the art that it is possible, by selection of suitable substituents, to produce also compounds of anti-vitamin character.

In the following examples some preferred embodiments of my present invention are described in more detail. The invention will, of course, not be limited to these examples.

Example 1

29.5 parts by weight of 1-methyl-2-nitro-2'-oxo-diethylsulfide are dissolved in 300 parts by volume of methanol; then 10.3 parts by weight of potassium hydroxide dissolved in 50 parts by volume of methanol are added thereto while cooling with ice. The mixture is allowed to stand at room temperature in a nitrogen atmosphere for 12 hours. It is then cooled to 0° C. and neutralized with acetic acid. The bulk of methanol is removed by distillation in vacuo and the residue diluted with water. The product is extracted with ether and the ethereal solution dried over sodium sulfate and evaporated. The remaining oil is distilled in a high vacuo whereupon 25 parts by weight of 2-methyl-3-nitro-4-hydroxy-thiophane are obtained as a slightly yellow oil of B. P.$_{0.01mm}$. 66–67° C. and $n_D^{24}$=1.5305.

The aldehyde used as starting material in the present example can be prepared in the following way:

Nitromethane and acetaldehyde are condensed in an aqueous alkali solution in order to form 1-nitro-2-hydroxy-propane of B. P.$_{11\text{ mm}}$ 89–90° C. By interaction with acetyl chloride 1-nitro-2-acetoxy-propane of B. P.$_{13\text{ mm}}$ 101° C. and $n_D^{23.5}=1.4255$ is obtained which is reacted with the sodium salt of mercaptoacetaldehyde-diethyl-acetal [(CH$_2$.SH.CH(OC$_2$H$_5$)$_2$)] in an alcoholic solution to form the diethyl-acetal of 1-methyl-2-nitro-2'-oxo-diethylsulfide of B. P.$_{0.05\text{ mm}}$ 90° C. and $n_D^{23}=1.4683$. This compound can also be obtained by causing the sodium salt of mercapto-acetaldehyde-diethyl-acetal to react with 1-nitro-2-chloro-propane of B. P.$_{13.5\text{ mm}}$ 63° C. and $n_D^{20.5}=1.447$, the latter compound being formed by reaction of 1-nitro-2-hydroxy-propane with phosphorus pentachloride in chloroform. Acid hydrolysis of the acetal so prepared in aqueous dioxane yields 1-methyl-2-nitro-2'-oxo-diethylsulfide in form of a yellow oil of B. P.$_{0.01\text{ mm}}$ 80° C. and $n_D^{25}=1.5031$. The p-nitrophenylhydrazone thereof melts at 126.5° C.

Example 2

5 parts by by weight of 1-(4'-carbethoxybutyl)-2-nitro-2'-oxo-diethylsulfide are dissolved in 20 parts by volume of ethanol and 2.1 parts by weight of KOH, dissolved in 20 parts by volume of ethanol, are added while cooling the mixture to 0° C. After standing at room temperature for 12 hours, 2.4 parts by weight of acetic acid are added with external cooling with ice water and the bulk of the ethanol distilled in vacuo. Dilute hydrochloric acid is added to the residue until the mixture has become acid to Congo red, whereupon the mixture is extracted with ether. The ethereal solution is washed with water to remove the excess of hydrochloric acid and then dried over sodium sulfate. After evaporation of the ether 3.9 parts by weight of a mixture of stereoisomeric 2-(4'-carboxybutyl)-3-nitro-4-hydroxy-thiophanes is obtained as a reddish oil.

When allowing this mixture to stand at —70° C., a mixture of stereoisomeric acids melting at 50–55° C. can be obtained. The crude product can also be converted, by conventional means, into a dimethylamine salt, which melts with decomposition at 110° C. after recrystallisation from an alcohol-acetone mixture.

Reduction of the crude 2-(4'-carboxybutyl)-3-nitro-4-hydroxy-thiophane with amalgamated aluminium in moist ether at a temperature of 0° C. yields 2-(4'-carboxybutyl)-3-amino-4-hydroxy-thiophane, which after recrystallisation from aqueous ethanol melts at 227–229° C. with decomposition.

The aldehyde used in this example as starting material can be obtained in the following manner:

5-carbethoxy-pentanal and nitromethane are reacted in an alcoholic solution in the presence of a base to form 1-nitro-2-hydroxy-ω-carbethoxy-hexane of B. P.$_{0.05\text{ mm}}$ 130° C., $n_D^{19}=1.4595$. This compound is converted into 1-nitro-2-chloro-ω-carbethoxy hexane of B. P.$_{0.01\text{ mm}}$ 100° C. (with partial decomposition) by treatment with phosphorus pentachloride in chloroform and the resultant compound is interacted with the sodium salt of mercaptoacetaldehyde-diethylacetal without further purification. The diethyl-acetal of 1-(4'-carbethoxybutyl)-2-nitro-2'-oxo-diethylsulfide so obtained can be purified by distillation in a molecular still at 130° C. (approx.) and forms a yellowish oil of $n_D^{18}=1.4738$. Acid hydrolysis of the said acetal in aqueous dioxane yields 1-(4'-carbethoxybutyl)-2-nitro-2'-oxo-diethylsulfide in form of an oil, from which a semicarbazone melting, after recrystallisation from ethanol-ether, at 90–91° C. can be prepared.

Example 3

To 3 parts by weight of 1-(4'-carboxybutyl)-2-nitro-2'-oxo-diethylsulfide is added a mixture of 6.5 parts by weight of a 24% aqueous solution of trimethylamine and 20 parts by volume of water. The resulting mixture is maintained at room temperature for 12 hours, 1.5 parts by volume of acetic acid being then added with external cooling. The solution is made acid to Congo red by addition of the required quantity of dilute hydrochloric acid and the resulting mixture extracted with ether. The ethereal extracts are washed with water, dried over sodium sulfate and evaporated. 2.4 parts by weight of a mixture of stereoisomeric 2-(4'-carboxybutyl)-3-nitro-4-hydroxy-thiophanes are thus obtained as a reddish oil, from which a dimethylamine salt decomposing at 110° C. can be obtained.

Example 4

8.5 parts by weight of 1-(4'-carbomethoxybutyl)-2-nitro-2'-oxo-diethylsulfide are dissolved in 10 parts by volume of dioxane and added to a solution of 1 part by weight of sodium in 60 parts by volume of dry methanol. After standing at room temperature for 6 hours 3 parts by volume of acetic acid are added thereto with external cooling and the methanol distilled off under reduced pressure. The residue is taken up in ether and washed with a potassium bicarbonate solution to remove acidic material. After drying over sodium sulfate the ether is distilled off, when 7.5 parts by weight of stereoisomeric 2-(4'-carbomethoxybutyl)-3-nitro-4-hydroxy-thiophanes are obtained as a yellow oil. The same can be converted into a mixture of p-nitrobenzoates by interaction with the calculated amount of p-nitrobenzoyl chloride and pyridine. The crude mixture of p-nitrobenzoates melts unsharply between 60 and 70° C. and can be separated, by repeated recrystallisation steps from a mixture of carbon tetrachloride and ether, into a higher melting stereoisomer of M. P. 104–105° C. and a lower-melting stereoisomer of M. P. 67–69° C.

The aldehyde used as starting material in the present example can be prepared in the following manner:

5-carbomethoxypentanal of B. P.$_{13\text{ mm}}$ 103° C. is condensed with nitro-methane in a methanolic solution in the presence of a base to give the 1-nitro-2-hydroxy-ω-carbomethoxy-hexane of B. P.$_{0.01\text{ mm}}$ 115° C., $n_D^{24}=1.4611$, M. P. 36° C. Reaction with acetyl chloride yields 1-nitro-2-acetoxy-ω-carbomethoxy-hexane of B. P.$_{0.01\text{ mm}}$ 115° C. and $n_D^{22.5}=1.4503$. This compound is then caused to react with the sodium salt of mercaptoacetaldehyde-dimethyl-acetal, prepared from bromodimethylacetal and potassium-hydrogen-sulfide, to yield the dimethyl-acetal of 1-(4'-carbomethoxybutyl)-2-nitro-2'-oxo-diethylsulfide, which is obtained as an almost colorless oil of $n_D^{22}=1.4802$. Acid hydrolysis in aqueous dioxane converts the latter compound into 1-(4'-carbomethoxybutyl)-2-nitro-2'-oxo-diethylsulfide, a yellowish oil, which yields a semicarbazone of M. P. 109.5° C.

Example 5

5 parts by weight of 1-methyl-2-nitro-2'-oxo-diethylsulfide and 25 parts by volume of liquid ammonia are maintained in a pressure vessel for 20 hours at a temperature of 10° C. The ammonia is then evaporated and a vacuum applied to the residue at 30° C. This is then taken up in ether and the ethereal solution extracted with dilute acetic acid to remove basic material. The ethereal solution is subsequently dried over sodium sulfate, evaporated and the residue distilled in a high vacuo. There are thus obtained 3.6 parts by weight of a mixture of stereoisomeric 2-methyl - 3 - nitro - 4 - hydroxy - thiophanes of B. P.$_{0.05\ mm.}$ 90° C. and $n_D^{23}$=1.5310. Simultaneously formed 2-methyl- 3 -nitro- 4 -amino-thiophane can be isolated from the aqueous acidic extract mentioned above by evaporating to dryness, when the acetate is obtained.

If the condensation is effected in an aqueous ammonia solution, instead of in liquid almost 100% ammonia, more 2-methyl-3-nitro-4-hydroxy-thiophane and only very slight amounts of the 4-amino-derivative will be obtained.

The preparation of the starting material used in the present example, i. e. 1-methyl-2-nitro-2'-oxo-diethylsulfide is described in Example 1 of this application.

What I claim is:

1. As new compounds, 3-nitro-4-hydroxy-thiophanes and their stereoisomers substituted in the 2-position and corresponding to the general formula

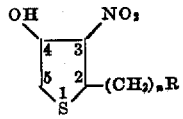

wherein $n$ means an integer from 1 to 7 inclusive and R means a member selected from the group consisting of hydrogen and carboxy and carbalkoxy radicals.

2. As new compounds, 2-(4'-carbalkoxybutyl) - 3-nitro-4-hydroxy-thiophanes and their stereoisomers.

3. As new compounds, 2-(4'-carbomethoxybutyl)-3-nitro-4-hydroxy-thiophane and its stereoisomers.

4. As new compounds, 2-(4'-carbethoxybutyl)- 3-nitro-4-hydroxy-thiophane and its stereoisomers.

5. As new compounds, 2-(4'-carboxybutyl)-3-nitro-4-hydroxy-thiophane and its stereoisomers.

6. As new compounds, 2-methyl-3-nitro-4-hydroxy-thiophane and its stereoisomers.

7. A process for the manufacture of 3-nitro-4-hydroxy-thiophanes and their stereoisomers substituted in the 2-position and corresponding to the general formula

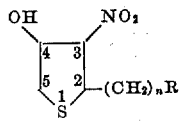

wherein $n$ means an integer from 1 to 7 inclusive and R means a member selected from the group consisting of hydrogen and carboxy and carbalkoxy radicals, which comprises subjecting a compound of the formula

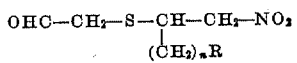

wherein $n$ and R have the aforementioned significances, to the action of a base until condensation and ring formation take place.

8. A process for the preparation of 2-(4'-carbalkoxybutyl) - 3 - nitro - 4 - hydroxy - thiophanes and their stereoisomers, comprising subjecting a 1-(4'-carbalkoxybutyl)-2-nitro-2'-oxo-diethylsulfide to the action of a base until condensation and ring formation take place.

9. A process for the preparation of 2-(4'-carbomethoxybutyl) - 3 - nitro - 4 - hydroxy - thiophane and its stereoisomers, comprising subjecting 1 - (4' - carbomethoxybutyl) - 2 - nitro - 2'-oxo-diethylsulfide to the action of a base until condensation and ring formation take place.

10. A process for the preparation of 2-(4'-carbethoxybutyl) - 3 - nitro - 4 - hydroxy - thiophane and its stereoisomers, comprising subjecting 1 - (4' - carbethoxybutyl) - 2 - nitro - 2' - oxo-diethylsulfide to the action of a base until condensation and ring formation take place.

11. A process for the preparation of 2-(4'-carboxybutyl) - 3 - nitro - 4 - hydroxy - thiophane and its stereoisomers, comprising subjecting 1 - (4' - carboxybutyl) - 2 - nitro - 2' - oxo - diethylsulfide to the action of a base until condensation and ring formation take place.

12. A process for the preparation of 2-methyl-3-nitro-4-hydroxy-thiophane and its stereoisomers, comprising subjecting 1-methyl-2-nitro-2'-oxo-diethylsulfide to the action of a base until condensation and ring formation take place.

CYRIL GROB.

REFERENCES CITED

The following references are of record in the file of this patent:

UNITED STATES PATENTS

| Number | Name | Date |
|---|---|---|
| 2,437,719 | Wolf | Mar. 16, 1948 |
| 2,440,659 | Baker | Apr. 27, 1948 |
| 2,443,598 | Cheney | June 22, 1948 |